US010889300B2

(12) United States Patent
Cho (10) Patent No.: US 10,889,300 B2
(45) Date of Patent: Jan. 12, 2021

(54) METHOD FOR CONTROLLING SUDDEN UNINTENDED ACCELERATION DUE TO MISOPERATION OF ENGINE IN POWER SPLIT TYPE HEV SYSTEM

(71) Applicants: HYUNDAI MOTOR COMPANY, Seoul (KR); KIA MOTORS CORPORATION, Seoul (KR)

(72) Inventor: Jin-Kuk Cho, Goyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 169 days.

(21) Appl. No.: 16/173,798

(22) Filed: Oct. 29, 2018

(65) Prior Publication Data

US 2019/0135288 A1 May 9, 2019

(30) Foreign Application Priority Data

Nov. 7, 2017 (KR) .......................... 10-2017-0147360

(51) Int. Cl.
*B60W 30/188* (2012.01)
*B60K 6/485* (2007.10)
(Continued)

(52) U.S. Cl.
CPC ......... *B60W 30/1884* (2013.01); *B60K 6/485* (2013.01); *B60W 10/08* (2013.01);
(Continued)

(58) Field of Classification Search
CPC .. B60W 30/1884; B60W 20/13; B60W 10/08; B60W 2510/0638; B60K 6/485;
(Continued)

(56) References Cited

U.S. PATENT DOCUMENTS 6,390,082 B1 * 5/2002 Duffy ...................... F02D 41/10
123/490
2009/0236160 A1 * 9/2009 Tanaka .................. B60W 20/00
180/65.265

(Continued)

FOREIGN PATENT DOCUMENTS

KR 2009-0062421 A 6/2009
KR 101664707 B1 * 10/2016 ............. B60K 6/445

OTHER PUBLICATIONS

Translation of KR101664707B1—Google Patents (Year: 2016).*

*Primary Examiner* — Anne Marie Antonucci
*Assistant Examiner* — Sahar Motazedi
(74) *Attorney, Agent, or Firm* — McDonnell Boehnen Hulbert & Berghoff LLP (57) ABSTRACT

A method for controlling a sudden unintended acceleration due to misoperation of an engine in a power split type hybrid electric vehicle (HEV) system, the method including when a determination is made that a delta revolution per minute (RPM) of an engine is out of a predetermined criterion, determining that an operating point of the engine does not move along a profile defined according to a target operating point of the engine and the sudden unintended acceleration is possible. The delta RPM is a difference of value between a current RPM of the engine and a profile RPM of the engine required to move to the target operating point of the engine from a current operating point of the engine.

8 Claims, 6 Drawing Sheets

(51) Int. Cl.
  *B60W 10/08* (2006.01)
  *B60W 20/13* (2016.01)
(52) U.S. Cl.
  CPC ........ *B60W 20/13* (2016.01); *B60L 2240/421* (2013.01); *B60L 2240/423* (2013.01); *B60L 2240/441* (2013.01); *B60L 2240/486* (2013.01); *B60W 2510/0638* (2013.01)
(58) Field of Classification Search
  CPC ......... B60L 2240/421; B60L 2240/423; B60L 2240/441; B60L 2240/486
  See application file for complete search history.

(56) References Cited

U.S. PATENT DOCUMENTS

| | | | |
|---|---|---|---|
| 2011/0231048 A1* | 9/2011 | Matsubara | B60K 6/365 701/22 |
| 2013/0211653 A1* | 8/2013 | Matsui | B60W 20/40 701/22 |
| 2019/0040813 A1* | 2/2019 | Kleist | F02D 41/22 |

* cited by examiner

FIG. 1

PRIOR ART

FIG. 2

PRIOR ART

METHOD FOR CONTROLLING SUDDEN UNINTENDED ACCELERATION DUE TO MISOPERATION OF ENGINE IN POWER SPLIT TYPE HEV SYSTEM

CROSS REFERENCE TO RELATED APPLICATIONS

This application claims priority to Korean Patent Application No(s). 10-2017-0147360, filed on Nov. 7, 2017, which is incorporated herein by reference in its entirety.

BACKGROUND

Field

Exemplary embodiments of the present disclosure relate to a method for controlling sudden unintended acceleration due to misoperation of an engine in a power split type hybrid electric vehicle (HEV) system.

Description of Related Art

Figure 1:
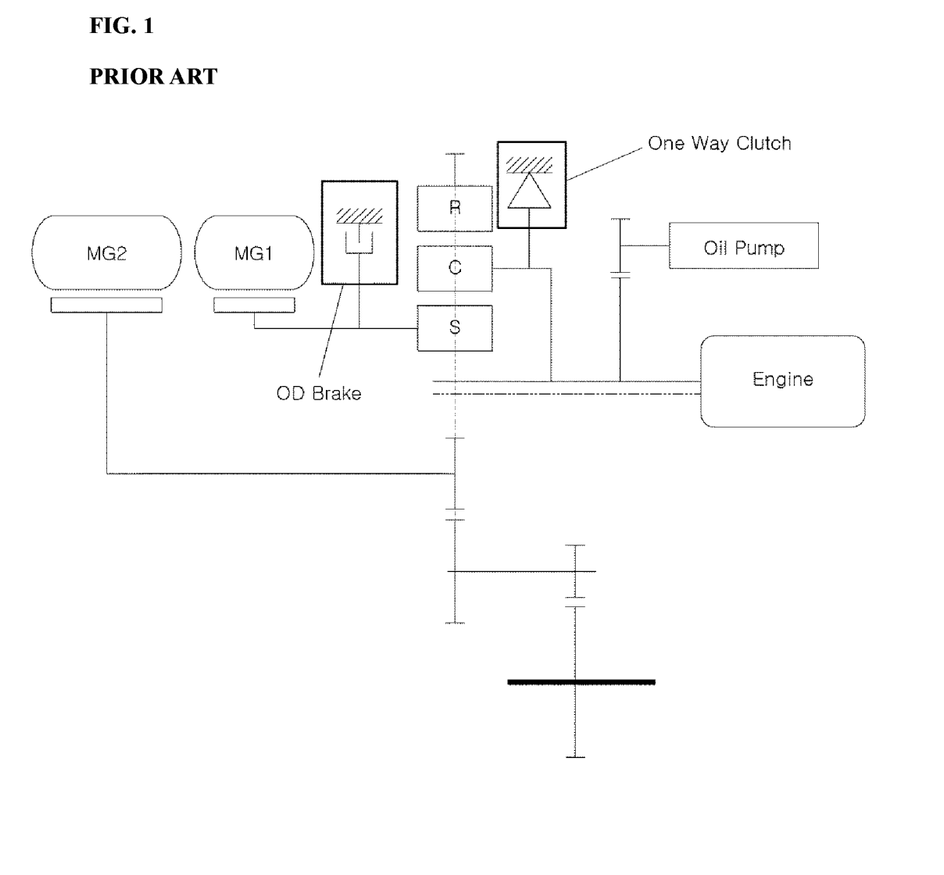
FIG. 1 schematically shows a general power split type HEV system.

In a power split type hybrid electric vehicle (HEV) system, as shown in FIG. 1, an engine, a generator, and a driving motor are connected through a planetary gear, which is physically connected to a driving shaft and driving wheels. A control device to control connection and disconnection of the above-mentioned parts does not exist separately.

That is, the engine, the generator MG1, and the drive motor MG2 are connected to one planetary gear or two or more planetary gears. Due to the nature of the planetary gear, appropriate reaction forces need to be applied to elements of the planetary gear such as a ring gear, a sun gear, and a carrier such that the gears transmit torque and output to the drive shaft without idle.

When an appropriate reaction force is applied to each gear, the torque of the engine is divided into the ring gear and the sun gear at a ratio determined by a gear ratio. For example, when the engine is generating a torque of 100 Nm in a system, part of the torque is transmitted to the generator MG1 for charging and the remainder is transmitted to the drive shaft.

In the above mentioned system, the motor and the generator perform reaction force control and generator speed control, respectively, and transmit the output of the engine to the drive wheels.

A rotational speed of the engine is not dependent on a traveling speed of the vehicle in terms of system structure. However, due to the gear ratio of the planetary gear, a speed change range of the engine is determined depending on the traveling speed of the vehicle.

Figure 2:
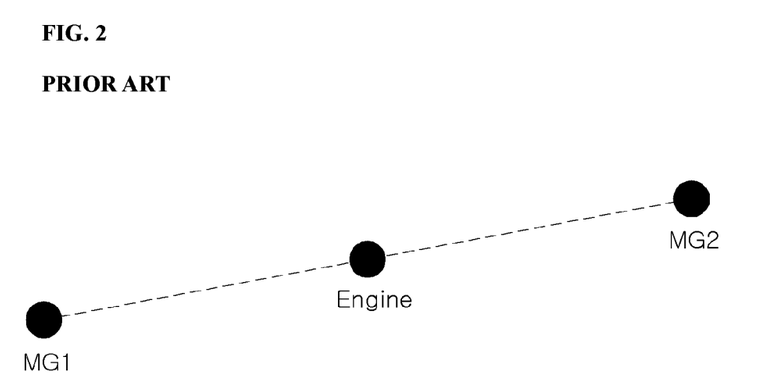
FIG. 2 shows a lever diagram of an MG1, an MG2, and an engine.

In this case, the generator MG1 can determine the rotational speed of the engine regardless of the vehicle speed. Here, the lever diagram is as shown in FIG. 2, and the required torque of the generator is expressed by the following Equations (1) to (4). A value of $T_{sun}$ in Equation (1) is the torque that the generator needs to output. The reaction force torque is the first term of Equation (1), which is a torque for maintaining a steady state. The speed control torque ($T_{speedcontrol}$) is a torque required to move an operating point of the engine to a target speed.

$$T_{sun} = -\frac{1}{1+R}T_{carrier} + T_{speedcontrol} \quad (1)$$

$$T_{out} = -\frac{R}{1+R}T_{carrier} + T_{ring} \quad (2)$$

$$T_{ring} = R \cdot T_{sun} \quad (3)$$

$$R = \frac{\#teeth_{ring}}{\#teeth_{sun}} \quad (4)$$

However, in such a structure, the output generated more than request by a driver, caused by misoperation of the engine, may act as a factor of sudden unintended acceleration.

SUMMARY

Embodiments of the present disclosure have been made to solve the problem described above, and an object is to provide a method for controlling sudden unintended acceleration due to misoperation of an engine in a power split type hybrid electric vehicle system.

In accordance with an embodiment, a method for controlling a sudden unintended acceleration due to misoperation of an engine in a power split type hybrid electric vehicle (HEV) system includes: when a determination is made that a delta revolution per minute (RPM) of an engine is out of a predetermined criterion, determining that an operating point of the engine does not move along a profile defined according to a target operating point of the engine and the sudden unintended acceleration is possible, in which the delta RPM is a difference of value between a current RPM of the engine and a profile RPM of the engine required to move to the target operating point of the engine from a current operating point of the engine.

The determination that a delta RPM of an engine is out of a predetermined criterion may be made by calculating a slope of the delta RPM and a holding time and determining whether or not the slope of the delta RPM exceeds a predetermined value B and the holding time exceeds a predetermined value C.

When a determination is made that the sudden unintended acceleration is possible, a control torque of 0 Nm may be output by a generator.

The control torque by the generator may be a sum of a reaction force torque to a torque output from the engine and a speed control torque for controlling a speed of the engine.

Fuel supply to the engine may be stopped at the same time as the control torque of 0 Nm is output by the generator.

When the fuel supply to the engine is stopped, a driving torque of a driving motor may be limited.

In accordance with another embodiment, a method for controlling a sudden unintended acceleration due to misoperation of an engine in an HEV system includes: determining whether or not the engine operates; when a determination is made that the engine operates, determining whether or not a delta RPM exceeds a predetermined value A, the delta RPM being a difference of value between a current RPM of the engine and a profile RPM of the engine required to move to a target operating point of the engine from a current engine state; when a determination is made that the delta RPM exceeds A, calculating a slope of the delta RPM and a holding time; determining whether or not the slope of the delta RPM exceeds a predetermined value B and the holding time exceeds a predetermined value C; and when the slope of the delta RPM exceeds the predetermined value B and the holding time exceeds the predetermined value C, determining that an operating point of the engine does not move along a profile defined according to the target operating point of the engine and a sudden unintended acceleration is possible.

When a determination is made that the sudden unintended acceleration is possible, a control torque output of 0 Nm may be output by a generator.

The control torque by the generator may be a sum of a reaction force torque to a torque output from the engine and a speed control torque for controlling a speed of the engine.

Fuel supply to the engine may be stopped as the same time as the control torque of 0 Nm is output by the generator.

When the fuel supply to the engine is stopped, a driving torque of a driving motor may be limited.

According to the method for controlling sudden unintended acceleration due to misoperation of an engine in a power split type HEV system of the present disclosure, an accident risk can be prevented by detecting the possibility of sudden unintended acceleration due to misoperation of the engine and avoiding the sudden unintentional acceleration.

In addition, when a failure occurs due to misoperation of the engine, over discharge of a battery can be prevented.

BRIEF DESCRIPTION OF THE FIGURES

Exemplary aspects are illustrated in the drawings. It is intended that the embodiments and figures disclosed herein are to be considered illustrative rather than restrictive.

DETAILED DESCRIPTION

In order to fully appreciate operational advantages of the present disclosure and objects achieved by implementation of the present disclosure, reference should be made to the accompanying drawings which illustrate preferred embodiments and the description in the accompanying drawings.

In describing the preferred embodiments, so as not to unnecessarily obscure the gist of the present disclosure, any well-known techniques will be briefly described or omitted, and no repetitive description thereof will be made.

Figure 3:
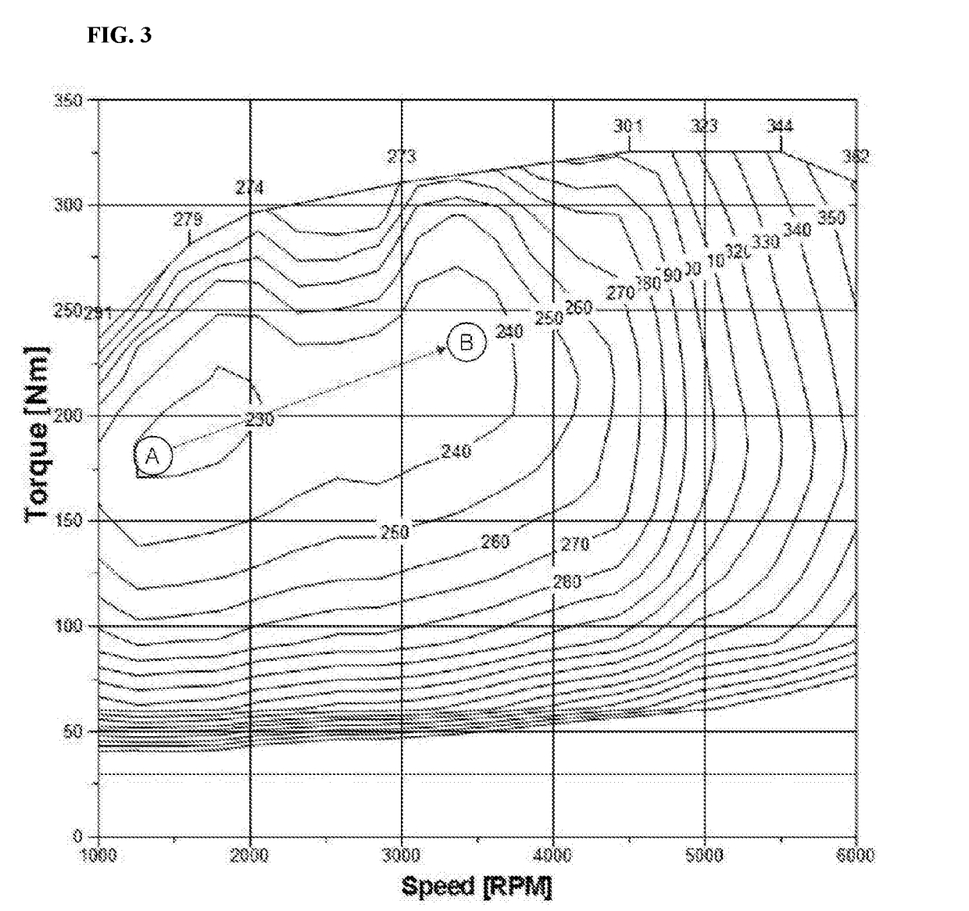
FIGS. 3 and 4 show an operating point control profile of an engine.
Figure 4:
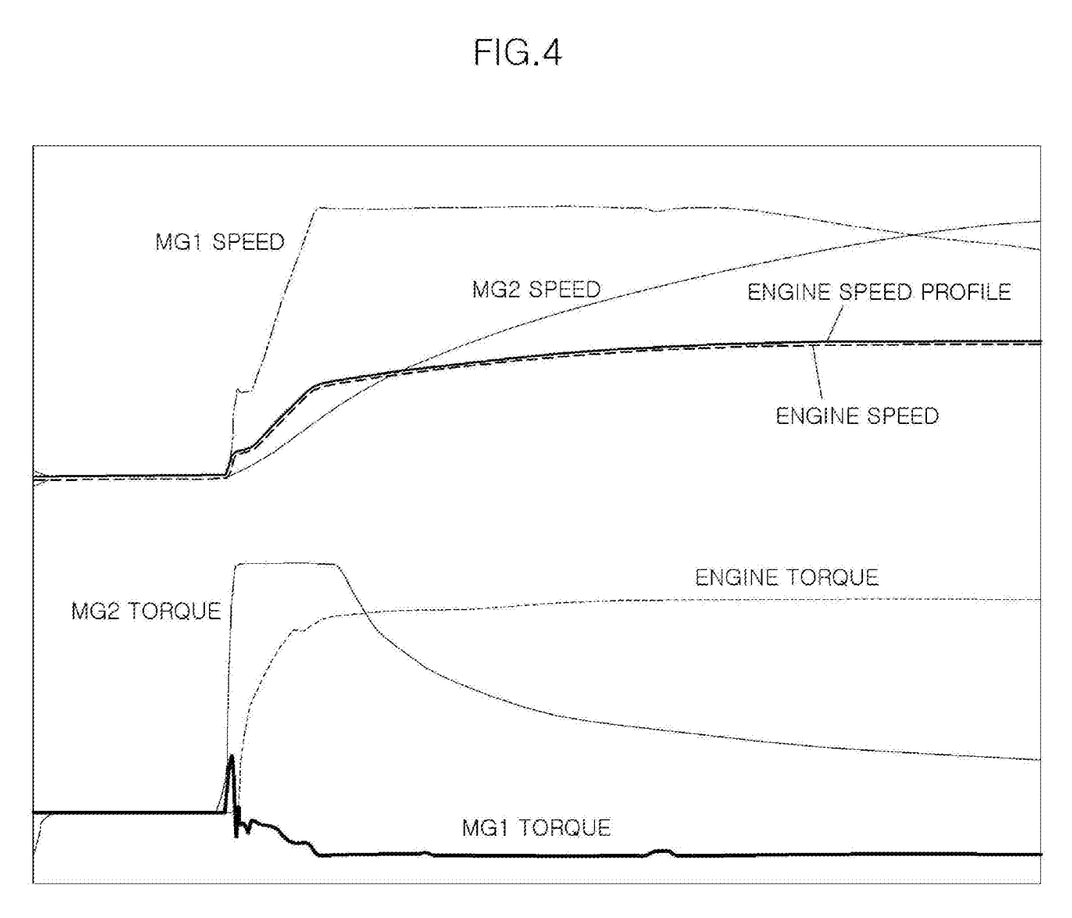
Figure 5:
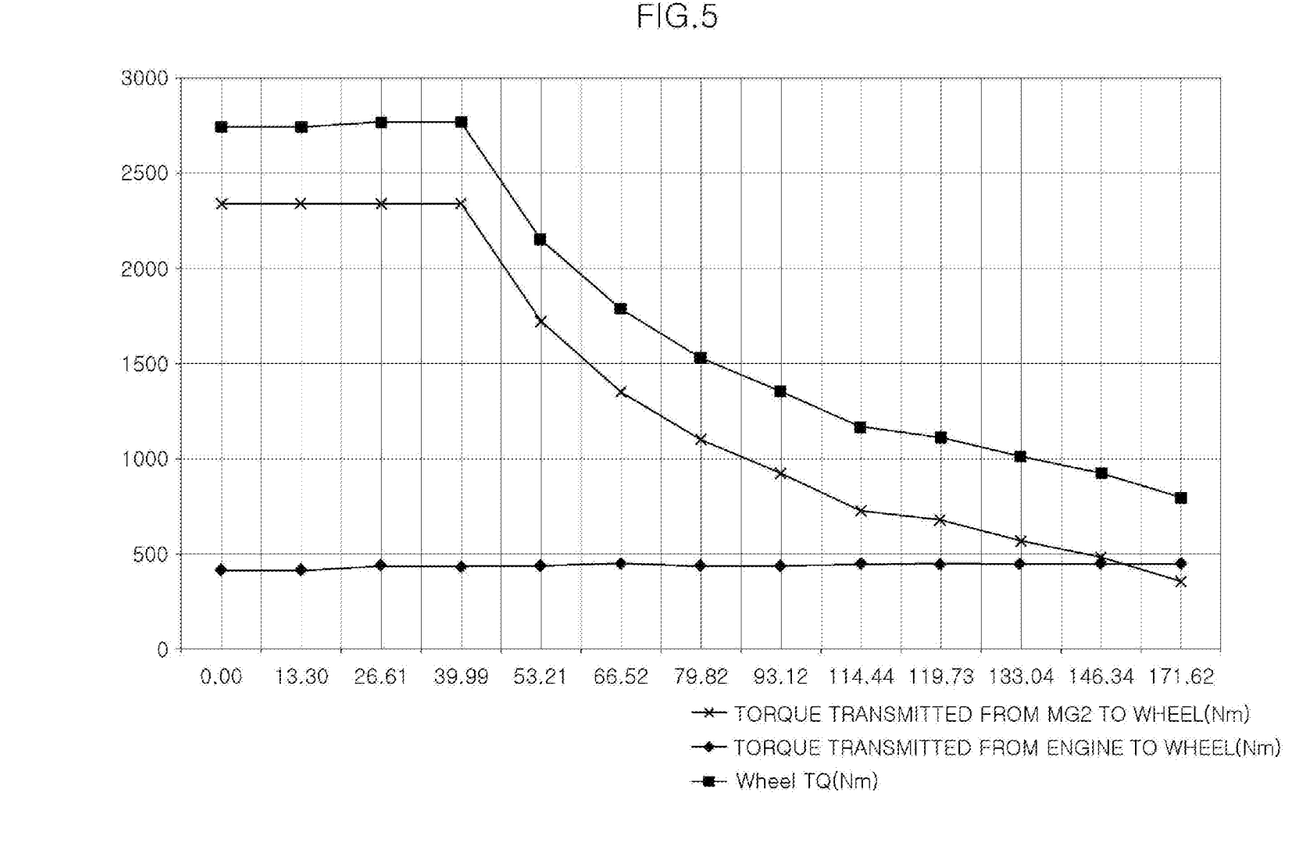
FIG. 5 shows maximum wheel torque characteristics of an IMED.
Figure 6:
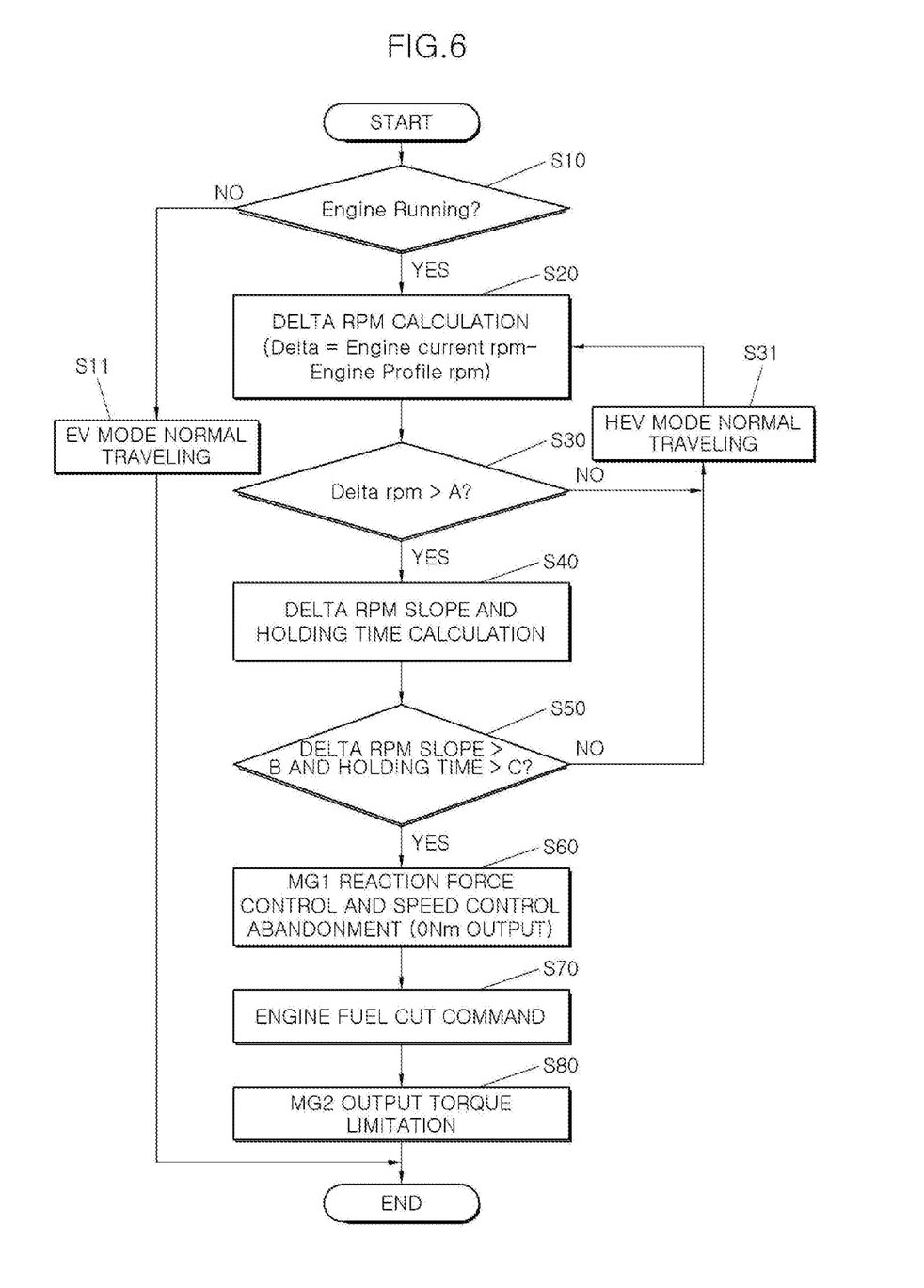
FIG. 6 shows a method of controlling sudden unintended acceleration due to misoperation of an engine in a power split type HEV system according to an embodiment of the present disclosure.

FIGS. 3 and 4 show an operating point control profile of an engine, FIG. 5 shows wheel maximum torque characteristics of an IMED, and FIG. 6 shows a method for controlling sudden unintended acceleration due to misoperation of an engine in a power split type HEV system of the present disclosure.

Hereinafter, a method for controlling sudden unintentional acceleration due to misoperation of an engine in a power split type HEV system according to an embodiment will be described with reference to FIG. 3 to FIG. 6.

The power split system senses the torque or power requested by a driver and determines the output that the engine needs to produce, taking an accounting of the state of charge (SOC) of a high-voltage battery of the vehicle or the like.

Unlike a transmission mounted electric device (TMED) system, the power split system can determine the operating point of the engine regardless of the traveling speed of the vehicle.

Therefore, when the operating point of the engine is controlled, a target engine operating point is determined based on the request by the driver, and then the operating point is moved to the target engine operating point from the current engine state with a certain slope and a profile.

The above-mentioned control is performed by MG1 acting as a generator. Here, torque output by the MG1 is determined by a sum of a reaction force torque to a torque output from the engine and a speed control torque for controlling a speed of the engine, as shown in Equation (1).

When the control is performed as described above, the operating point of the engine moves to the target operating point, along a predetermined profile, as shown in FIGS. 3 and 4.

However, when misoperation of the engine occurs, the operating point of the engine deviates from the profile. For example, when an electric throttle controller (ETC) fails and more air enters an engine intake valve than air required for control, the vehicle accelerates more than the driver has requested.

Since a maximum torque value of the MG1 is determined so as to control up to the maximum torque of the engine in system design, when misoperation of the engine occurs within the maximum torque range, it is possible to compensate for the engine speed by MG1 speed control. However, when an uncontrollable failure exceeding the maximum torque of the engine, such as the throttle full opening as described above, occurs, it is not possible to perform control since it is beyond the MG1 control limit.

FIG. 5 is a graph showing a maximum wheel torque of when an MG2 and the engine of the IMED system output maximum torque.

The torque of the engine connected to a carrier of the planetary gear is partially transmitted to the generator (MG1) connected to a sun gear for charging, and the remaining torque is transmitted to drive wheels through a ring gear.

In this case, when the engine outputs excessive torque without outputting the torque requested by a hybrid control unit (HCU) due to a failure or the like, a situation in which the acceleration is greater than the acceleration requested by the driver will be described as follows.

1) Excessive torque is output compared to the torque that the engine needs to produce.

2) As shown in Equation (1), the torque of MG1 is output as the sum of the speed control torque and the reaction force torque for the steady state. Here, the reaction force torque is determined by the torque that the engine needs to produce, which is requested by the HCU. The reaction torque does not change even when misoperation of the engine occurs.

When misoperation of the engine occurs, an excessive torque of the engine is transmitted to the sun gear and the ring gear, and the remaining torque increases the engine speed. The speed control torque of the MG1 limits the increase of the engine speed, which makes the reaction torque of the MG1 increase. Accordingly, speed control of the MG1 causes the excessive torque of the engine to be transmitted to the ring gear.

3) When a torque to be output from the sun gear is greater than a maximum torque of the MG1 due to the excessive torque of the engine, the engine speed is raised differently from the target profile.

4) The vehicle accelerates more than the request by the driver for the reason 2), and determination can be made that a sudden unintended acceleration situation due to misoperation of the engine is possible by the situation 3).

FIG. 6 sequentially shows a method for controlling sudden unintended acceleration due to misoperation of an engine in a power split type HEV system of the present disclosure having principle described above.

Determination is made whether or not the engine is running (S10). If the engine is not running, the engine is controlled in an EV mode normal traveling (S11), and if the engine is running, delta rpm, which is a difference of value between current rpm of the engine and profile rpm of the engine, is calculated (S20) to monitor whether the operating point of the engine moves along a predetermined profile.

A determination is made whether or not the operating point of the engine moves above the profile by a predetermined value A or more for a predetermined period of time (S30, delta rpm>A?). If the determination is positive, a slope and a holding time of the delta rpm are calculated (S40). Then, a determination is made whether or not the holding time exceeds the predetermined period of time C and the slope is greater than the predetermined slope B (S50). If the delta rpm slope is out of the predetermined slope B or the holding time of the delta rpm is out of the predetermined period of time C, a determination is made that sudden unintended acceleration due to a failure of the engine is possible.

If the result of the determination in S30 does not exceed the A value, the vehicle is controlled to be in the HEV mode normal traveling (S31).

Then, if neither of the results of the determination in S50 is out of the predetermined slope B or the predetermined period of time C, the vehicle is controlled to be in the HEV mode normal traveling (S31).

When a determination is made that a sudden unintended acceleration due to misoperation of the engine is possible in S50, the hybrid control unit (HCU), which is the highest controller, changes a control torque command of the MG1 to 0 Nm and prevents further control (S60).

Due to the nature of the power split system, the control of the MG1 may cause the sudden unintended acceleration in that situation. Therefore, the control of the MG1 is abandoned for the safety of the driver.

When the control of the MG1 is abandoned in S60, the engine speeds up to the maximum rotational speed. However, since the control of the MG1 is not performed, the unintentional output of the engine is no longer transmitted to the drive shaft, which prevents the sudden unintended acceleration.

However, when the engine speed stays at a level higher than the maximum rotational speed, the driver feels a sense of insecurity. Therefore, the HCU, which is the highest controller, abandons the control of the MG1 and transmits a fuel cut control command of the engine to an engine controller, so that no more fuel is supplied to the engine (S70).

However, when the request by the driver is satisfied by the electric vehicle mode in a state where the control for suppressing the operation of the engine is performed, the high-voltage battery is overdischarged, which may result in shortening the life of the battery.

Therefore, the driving torque of the MG2 is limited such that the driver escapes from a dangerous situation. In addition to that, the acceleration of the vehicle is limited such that the overdischarge of the high voltage battery is prevented (S80).

It is desirable that the driving torque of the MG2 is limited to a limp home mode, that is, to a degree that the vehicle can be parked on a shoulder.

As described above, in the present disclosure, a determination is made whether or not sudden unintended acceleration due to misoperation of the engine. If the sudden unintended acceleration is possible, control of the MG1 is not performed, and the fuel supply to the engine is limited. Since the output torque of the MG2 is limited, even when misoperation of the engine occurs, sudden unintended acceleration can be prevented from occurring, which makes it possible to protect the driver and the vehicle.

This also makes it possible to prevent overdischarge of the high voltage battery.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A method for controlling a sudden unintended acceleration due to misoperation of an engine in a power split type hybrid electric vehicle (HEV) system, the method comprising:
when a determination is made that a delta revolution per minute (RPM) of the engine is out of a predetermined criterion, determining that an operating point of the engine does not move along a profile defined according to a target operating point of the engine and the sudden unintended acceleration is possible,
wherein the delta RPM is a difference of value between a current RPM of the engine and a profile RPM of the engine required to move to the target operating point of the engine from a current operating point of the engine;
wherein the determination that the delta RPM of the engine is out of the predetermined criterion is made by:
calculating the delta RPM;
calculating a slope of the delta RPM;
determining whether or not the slope of the delta RPM exceeds a predetermined value B;
calculating a holding time for which the slope of the delta RPM exceeds the predetermined value B; and
determining whether or not the holding time exceeds a predetermined value C;
wherein when a determination is made that the sudden unintended acceleration is possible, a control torque of 0 Nm is output by a generator.

2. The method of claim 1, wherein the control torque by the generator is a sum of a reaction force torque to a torque output from the engine and a speed control torque for controlling a speed of the engine.

3. The method of claim 1, wherein fuel supply to the engine is stopped at the same time as the control torque of 0 Nm is output by the generator.

4. The method of claim 3, wherein when the fuel supply to the engine is stopped, a driving torque of a driving motor is limited.

5. A method for controlling a sudden unintended acceleration due to misoperation of an engine in a power split type hybrid electric vehicle (HEV) system, the method comprising:
determining whether or not the engine operates;
when a determination is made that the engine operates, determining whether or not a delta RPM exceeds a predetermined value A, the delta RPM being a difference of value between a current RPM of the engine and a profile RPM of the engine required to move to a target operating point of the engine from a current engine state;
when a determination is made that the delta RPM exceeds the predetermined value A, calculating a slope of the delta RPM;
determining whether or not the slope of the delta RPM exceeds a predetermined value B;
calculating a holding time for which the slope of the delta RPM exceeds the predetermined value B;
determining whether or not the holding time exceeds a predetermined value C; and
when the slope of the delta RPM exceeds the predetermined value B and the holding time exceeds the predetermined value C, determining that an operating point of the engine does not move along a profile defined according to the target operating point of the engine and the sudden unintended acceleration is possible; and
wherein when a determination is made that the sudden unintended acceleration is possible, a control torque of 0 Nm is output by a generator.

6. The method of claim 5, wherein the control torque of the generator is a sum of a reaction force torque to a torque output from the engine and a speed control torque for controlling a speed of the engine.

7. The method of claim 5, wherein fuel supply to the engine is stopped at the same time as the control torque of 0 Nm is output by the generator.

8. The method of claim 7, wherein when the fuel supply to the engine is stopped, a driving torque of a driving motor is limited.

* * * * *